June 1, 1965    M. L. GRELLA    3,186,379
BIRD FEEDER
Filed Jan. 7, 1964
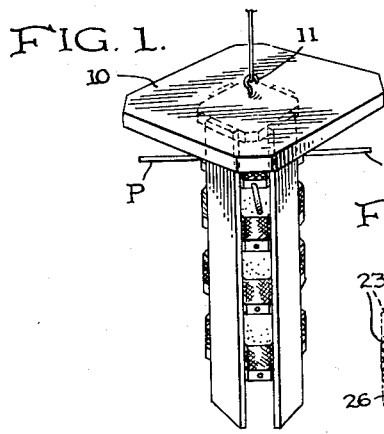
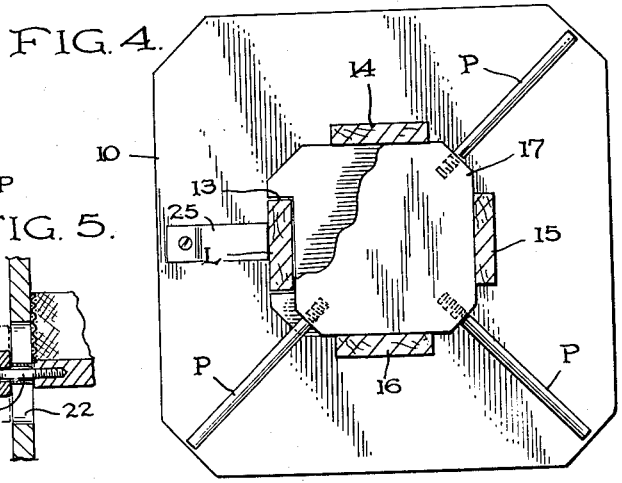
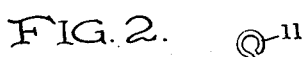
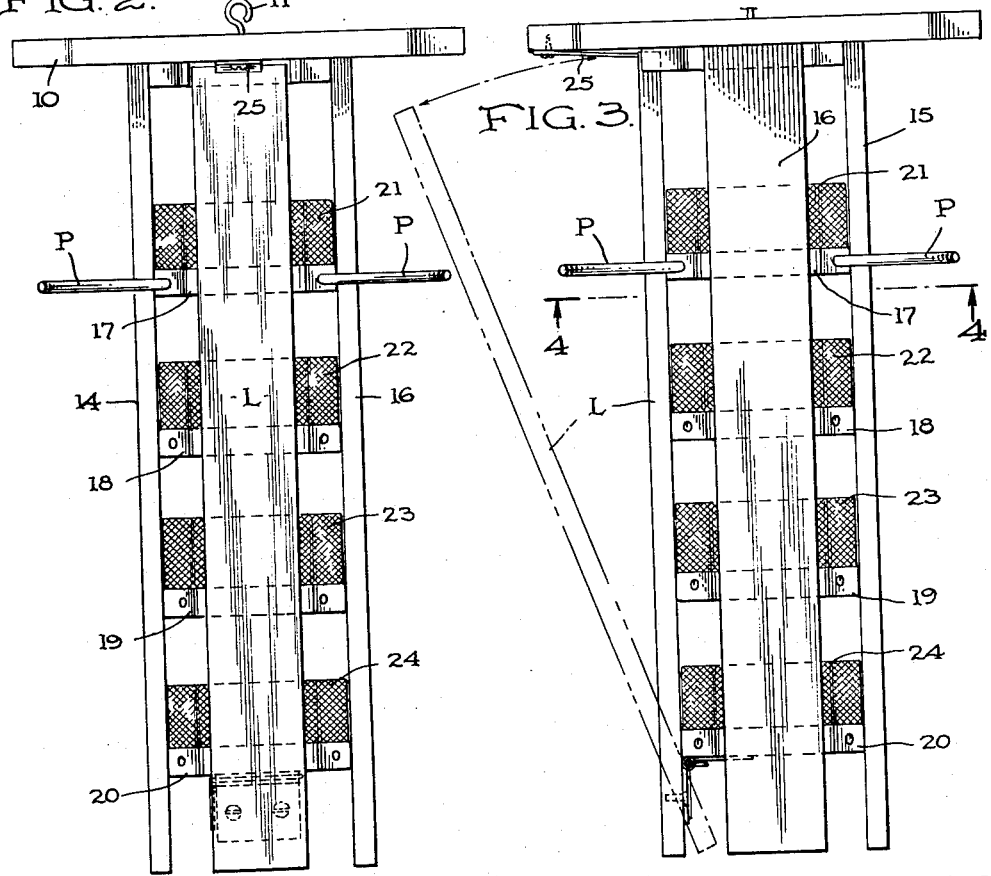
INVENTOR
MICHAEL L. GRELLA
BY *Edwin E. Greigg*
ATTORNEY

United States Patent Office 3,186,379
Patented June 1, 1965

3,186,379
BIRD FEEDER
Michael L. Grella, 451 Fulton Ave., Hempstead, N.Y.
Filed Jan. 7, 1964, Ser. No. 336,220
7 Claims. (Cl. 119—51)

This invention relates to improvements in feeding devices especially for wild birds and, more particularly, for small birds of the clinging type such as chicadees, nuthatches, titmice and woodpeckers.

Many feeding devices that have been constructed and offered for sale heretofore, particularly for the accommodation of wild birds, have been improperly designed to such an extent that the larger varieties of wild birds, such as starlings, blue jays, etc., and squirrels are capable of eating therefrom and being notorious fighters, consequently frighten away the smaller birds which must either go hungry or resort to picking from the ground whatever may fall from the feeder. When considerable snow has fallen upon the ground, those few seeds that fall from the feeder cannot always be recovered by the birds until after a thaw.

Accordingly, the principal object of this invention is the provision of a wild-bird feeder which is constructed in such a manner that those desirable smaller birds can readily gain access to the feed.

Another object of the invention is the provision of a simplified construction adequate to support and simultaneously feed a large number of birds, including both large and small when this is desirable.

Still another object of the invention is the provision of an arrangement of elements which are so constructed that particular areas of the feeder are restricted to use only by small wild birds.

The details of the invention, as well as additional objects and advantages, will be clearly understood with reference to the embodiments illustrated in the accompanying drawing employing similar reference numerals to identify the same elements in each of the similar views, and in which:

FIG. 1 is an angular perspective view of the feeder looking downwardly into the trays of feed;

FIG. 2 is a side elevational view of the feeder;

FIG. 3 is a side elevational view partially broken away in section with the feeder turned at 90° to the view of FIG. 2; and FIG. 4 is a section on line 4—4 of FIG. 3.

With reference to FIG. 1, there is illustrated, in the perspective view, a wild-bird feeder of the suspended type particularly designed so that certain areas thereof may be restricted to supply or furnish food only for small birds. The roof-like element 10, as shown, comprises a flat board-like member which may be constructed of wood, etc., in the center of the planar surface of which is positioned a screw eye 11 and by means of which the feeding device may be suitably suspended from an inverted L-shaped member, tree limb, or any other suitable support. Although the top or roof 10 of the feeder is preferably made in the simplified manner shown, it is within the scope of this invention to provide a more elaborate, fanciful roof, if desired. Beneath the roof 10 and in substantially the axial center thereof there is secured a head plate 12 which is of substantially octagonal configuration and through which the shank of the screw eye may be adapted to pass. The head plate 12 is suitably notched in its perimeter, as at 13 for a purpose that will be enlarged upon later herein. A series of rough-sawed, rigid, slat-like, elongated, spaced members 14, 15 and 16 are fastened by screws or in any other preferred manner to the head plate 12 as well as to the roof 10 and are thereby arranged to extend therefrom in the manner shown.

A series of tiered platforms 17–20 also of substantially octagonal configuration are supported beneath the head plate 12 and are suitably fastened to the elongated members 14, 15 and 16 by screws, nails or any other suitable media. Preferably the platforms should be so arranged to be readily removable.

From an examination of FIGS. 1–3 it will be noted that each of the tiered platforms 17–20 are provided with foraminous trays 21–24 of adequate height to support a goodly quantity of feed, but still leave only sufficient space between the upper lip or edge thereof and the bottom wall of the adjacent tiered platform to permit only a small bird to obtain feed therefrom. The slat-like elongated members are constructed of unfinished material thus retaining a rustic appearance and also providing a roughened surface to which small wild birds may cling. These slat-like members 14–16 are of a width, and the vertical edges are predeterminately so spaced from each other, that the openings which they thus form are only adequate for passage of the head of a small bird. In other words, the wildbird feeder shown may be made in various sizes, can include a smaller or greater number of tiered platforms that the form illustrated, but the critical factor is the over-all area of the opening furnished between the spaced edges of the angularly opposed, elongated members, as well as that provided between the lip of the tray and the bottom of the platform thereabove. The openings provided by these elements thus prevent large birds from scattering feed to the ground which would provide a particular attraction for vermin, mice, rats, etc. Another difficulty would arise from making the access area too large, for in all probability the larger wild birds would be able to gain access to the feed in the device and the small birds would again be prevented from eating.

To provide access to the trays and consequent filling with feed when necessary, the elongated member L is pivotally attached to the feeder by a suitable hinge element fastened to the platform 18 and the inner surface of said member as best shown in FIG. 3. Note in this view that the pivotally mounted elongated member L is shown in phantom lines in an open position relative to the feeder and in full-lines in its closed condition.

Several different media are shown for retaining the pivotal member L in closed position. A leaf spring 25 secured beneath the roof 10 with its free end adapted to project downwardly into engagement with the front wall of the pivotal member L is the preferred manner of gaining access to the device for replacing feed. However, still another manner of retaining this member in closed position would be by means of the arrangement shown in FIG. 5. Here, the member L is not provided with a hinge as shown in FIG. 3, but is free for complete removal from the feeder and is provided with an elongated aperture or slot 22 which registers with one of the platforms, such as at 16. A wing nut 23 is rotatably positioned on a suitable screw 26 that is secured to the platform, as shown, and is maintained in its offstanding position therefrom by means of a spacer 40. Thus, the member L may be readily placed in position and held by the wing nut, this latched condition being best shown in full lines in FIG. 3.

In the respective view of this feeder, a series of slender peg-like elements P are illustrated. These provide an upper perch only for the larger birds to sit upon and grasp while eating, but such peg-like elements are not provided on the lower tiers since they are not essential to the eating habits of the smaller birds. As will be also appreciated, the pegs may be entirely eliminated particularly where the feeder is offered for sale for the exclusive feeding of small birds only.

It is within the scope of this invention to utilize a grade of wire for the feed trays which is appropriately rustproofed and subsequently coated with a thin film of a suitable plastic material. The grade of wire which is utilized includes interstices of a size adequate to retain the feed, but of an area through which rain will quickly pass. Of course, where appropriate plastic is obtainable, the feed trays may be constructed of that material.

Since the larger variety of wild birds prefer a perch or other means which they may grasp, they are consequently discouraged from attempting to eat from this feeder, particularly in the areas thereof where the peg-like elements P are not included.

Although two embodiments of the invention have been depicted and described, it will be apparent that these embodiments are illustrative in nature and that a number of other modifications in the apparatus and variations in its end use may be effected without departing from the spirit or scope of the invention as defined in the appended claims.

What I claim is:

1. In a wild-bird feeder assembly, the combination comprising a series of vertically aligned predeterminately, spaced platforms and spaced, opposed, parallel, elongated members including upper and lower extremities for positioning said platforms in vertical, tiered relation, upstanding bird-feed retaining elements positioned on each of said platforms, means permitting disassembly of at least one of said spaced, opposed, elongated members from said feeder, a roof-like member carried above and in substantially abutted relation to the extremities of said elongated members, means secured to said roof for suspending said feeder from a support means and means for locking the removable elongated member against inadvertent displacement relative to the assembly.

2. In a wild-bird feeder assembly the combination comprising a series of vertically aligned predeterminately, spaced platforms and spaced, opposed, parallel, elongated members including upper and lower extremities for positioning said platforms in vertical tiered relation, foraminous feed retaining elements positioned on each of said platforms, means permitting pivotal movement of at least one of said spaced, opposed, elongated members relative to said platforms, a roof-like member carried above and in abutted relation to the extremities of said elongated members, means secured to said roof for suspending said feeder from a support, a plurality of peg-like bird-supporting members carried by the perimeter of at least one of said platforms, said pegs offstanding radially between adjacent parallel elongated members and means for latching the free upper extremity of said pivotally supported elongated member against inadvertent displacement relative to the assembly.

3. In a wild-bird feeder as claimed in claim 2, wherein the foraminous feed retaining elements supported on said platform are removable.

4. In a wild-bird feeder as claimed in claim 2, wherein the roof-like member has secured substantially axially therebeneath a head element the perimeter of which is suitably notched and thereby adapted to receive the free extremity of said pivotal element.

5. In a wild-bird feeder as claimed in claim 4, wherein spring-latch means carried by the roof-like element cooperates with the free upper extremity of said pivotal elongated member to maintain the same in juxtaposed surface contact relative to each of said platforms.

6. In a wild-bird feeder as claimed in claim 4, wherein spring means are associated with the means permitting pivotal movement of said elongated member to thereby urge said member away from the platforms when said latch is disengaged.

7. In a wild-bird feeder as claimed in claim 2, wherein the peg-like bird-supporting members are removable from the perimeter of said platform.

References Cited by the Examiner
UNITED STATES PATENTS

| | | | |
|---|---|---|---|
| 1,749,497 | 3/30 | McGlashan | 119—61 |
| 2,306,312 | 12/42 | Hyde | 119—51 |
| 2,634,705 | 4/53 | Mayes | 119—51 |

SAMUEL KOREN, *Primary Examiner.*

HUGH H. CHAMBLEE, *Examiner.*